(12) United States Patent
Luckay

(10) Patent No.: US 12,269,683 B2
(45) Date of Patent: Apr. 8, 2025

(54) AUTOMATED SYSTEMS AND DEVICES FOR LOADING AND UNLOADING

(71) Applicant: United States Postal Service, Washington, DC (US)

(72) Inventor: Ryan M. Luckay, Vienna, VA (US)

(73) Assignee: United States Postal Service, Washington, DC (US)

( * ) Notice: Subject to any disclaimer, the term of this patent is extended or adjusted under 35 U.S.C. 154(b) by 218 days.

(21) Appl. No.: 17/189,003

(22) Filed: Mar. 1, 2021

(65) Prior Publication Data

US 2021/0276800 A1 Sep. 9, 2021

Related U.S. Application Data

(60) Provisional application No. 62/984,598, filed on Mar. 3, 2020.

(51) Int. Cl.
*B65G 1/137* (2006.01)
*B65G 1/04* (2006.01)
*G05D 1/00* (2006.01)
*G06Q 10/087* (2023.01)

(52) U.S. Cl.
CPC ......... *B65G 1/0492* (2013.01); *B65G 1/1371* (2013.01); *B65G 1/1373* (2013.01); *G05D 1/0274* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 7,484,663 B2 * | 2/2009 | Olsen, III | G06Q 10/08 235/375 |
| 7,894,933 B2 * | 2/2011 | Mountz | G06Q 10/087 700/214 |
| 8,606,392 B2 * | 12/2013 | Wurman | G05B 19/41895 700/214 |
| 9,367,827 B1 * | 6/2016 | Lively | G06Q 10/08355 |
| 9,637,310 B1 * | 5/2017 | Zou | G06Q 10/08355 |
| 10,351,346 B2 * | 7/2019 | Otto | G06Q 10/087 |
| 10,705,538 B2 * | 7/2020 | Yang | G05D 1/0291 |
| 10,787,315 B2 * | 9/2020 | Hance | G06Q 10/0833 |
| 10,815,080 B2 * | 10/2020 | Anderson | B65G 67/02 |
| 10,899,591 B2 * | 1/2021 | Soder | B65G 67/24 |
| 2013/0103552 A1 * | 4/2013 | Hoffman | G06Q 10/00 705/28 |

(Continued)

*Primary Examiner* — Mark C Hageman
(74) *Attorney, Agent, or Firm* — Knobbe, Martens, Olson & Bear, LLP

(57) ABSTRACT

A system for loading and unloading containers of items from transport vehicles and moving containers of items to and from desired locations using automated robots are disclosed. The system includes one or more automated robots, a base station, and one or more vehicle-based systems. The automated robots are configured to move to, lift, and carry containers of items. The base station is configured to coordinate the movements of the automated robots. The vehicle-based systems are associated with transport vehicles and configured to communicate information about containers on the transport vehicles to the base station or automated robots. The vehicle-based systems may call the one or more automated robots to automatically load or unload the transport vehicles.

17 Claims, 10 Drawing Sheets

(56) References Cited

U.S. PATENT DOCUMENTS

| | | | |
|---|---|---|---|
| 2015/0235165 A1* | 8/2015 | Miette | B07C 3/02 |
| | | | 705/337 |
| 2016/0129592 A1* | 5/2016 | Saboo | G05D 1/0297 |
| | | | 700/248 |
| 2016/0145045 A1* | 5/2016 | Mountz | B65G 1/137 |
| | | | 700/218 |
| 2019/0066041 A1* | 2/2019 | Hance | G01C 21/3407 |

* cited by examiner

AUTOMATED SYSTEMS AND DEVICES FOR LOADING AND UNLOADING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Application No. 62/984,598, Mar. 3, 2020, the entire contents of all of which are hereby incorporated by reference.

SUMMARY

In one aspect described herein, a system for processing containers of items, the system comprises one or more automated robots, the automated robots comprising: a drive portion; and one or more sensors, the sensors configured to identify a location of the one or more automated robots within a facility and to identify one or more containers for processing; a server configured to communicate with and instruct the one or more automated robots; and a distribution information database in communication with the server, the distribution information database comprising a container identifier and distribution information for a container; wherein the server is configured to: receive a container identifier for the container, the container being located on a vehicle at a loading dock of the facility; determine, in the distribution information database, an intended location for the container; instruct one or more of the automated robots to move to a location of the container on the vehicle; and instruct the one or more of the automated robots to transport the container to the determined intended location for the container.

In some embodiments, the one or more automated robots further comprise a lift mechanism.

In some embodiments, the one or more automated robots are configured to move underneath the container and to actuate the lift mechanism to lift the container off a surface, thereby allowing the one or more automated robots to move the container.

In some embodiments, the container identifier includes a container type.

In some embodiments, the server is further configured to determine, based on the container type, a number of the one or more automated robots required to transport the container.

In some embodiments, the container is a pallet, and wherein the server identifies that a plurality of automated robots are required to transport the pallet.

In some embodiments, the server instructs the plurality of automated robots to move to different locations under the pallet in order to transport the pallet.

In some embodiments, the server is configured to receive the container identifier for the container from a vehicle-based system on the vehicle.

In some embodiments, the server is configured to determine, in the distribution information database, the intended location for the container based on identifying, in the distribution information database, a next process for one or more items contained within the container.

In some embodiments, the distribution information database includes a plurality of locations within the facility, each of the plurality of locations being associated with a process within the facility, and wherein the server is configured to identify the intended location from the plurality of locations based on the next process for one of the one or more items in the container.

In another aspect described herein, a method for processing containers of items, the method comprises receiving, in a server of a facility, a container identifier for a container, the container being located on a vehicle at a loading dock of the facility; determining, in a distribution information database, an intended location within the facility for the container; instructing, by the server, one or more automated robots to move to a location of the container on the vehicle, the one or more automated robots comprising: a drive portion; and one or more sensors, the sensors configured to identify a location of the one or more automated robots within the facility and to identify one or more containers for processing; identifying, via the one or more sensors, the container having the received container identifier thereon; and instructing, by the server, the one or more automated robots to transport the container to the determined intended location for the container.

In some embodiments, the one or more automated robots further comprise a lift mechanism.

In some embodiments, the method further comprises moving the one or more automated robots underneath the container; actuating the lift mechanism on the one or more automated robots underneath the container; lifting the container off a surface, thereby allowing the one or more automated robots to transport the container; and moving the container to the intended location.

In some embodiments, receiving the container identifier comprises receiving a container type.

In some embodiments, the method further comprises determining, based on the received container type, a number of the one or more automated robots required to transport the container.

In some embodiments, the container is a pallet, and wherein the method comprises determining that a plurality of automated robots are required to transport the pallet.

In some embodiments, the method further comprises instructing the plurality of automated robots to move to different locations under the pallet in order to transport the pallet.

In some embodiments, receiving the container identifier comprises receiving the container identifier from a vehicle-based system located on the vehicle.

In some embodiments, the intended location for the container is determined by the server based on identifying, in the distribution information database, a next process for one or more items contained within the container.

In some embodiments, the distribution information database includes a plurality of locations within the facility, each of the plurality of locations being associated with a process within the facility, and wherein identifying the intended location for the container comprises identifying the intended location from the plurality of locations based on the next process for one of the one or more items in the container.

BACKGROUND

Field

This disclosure relates to the field of transportation of items. In particular, this disclosure presents systems, devices, and methods for loading and unloading containers of items from transport vehicles and moving containers of items to and from desired locations using automated robots.

Description

Transportation of various types of items frequently includes loading and unloading the items from one or more transport vehicles. As one example, mail processing and delivery operations may involve receiving, unloading, transporting, loading, and delivering thousands of items, which can include letters, flats, parcels, and the like. These mail items are often grouped into trays, bins, pallets, or other containers. During transportation, these containers of mail items are loaded into or unloaded from various transport vehicles, such as airplanes, trains, semi-trucks, local delivery trucks, and others. Loading and unloading can be time consuming and expensive, often requiring extensive manpower and machinery, such as forklifts. Busy loading docks can be hazardous to workers, and diesel-powered forklifts create undesirable pollution and noise. Further, manual loading and unloading of items often exposes the items to loss, due to misplacement, theft, or damage, for example. In some embodiments, the systems, devices, and methods for automated loading and unloading described herein can improve the efficiency and safety of the loading and unloading process.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
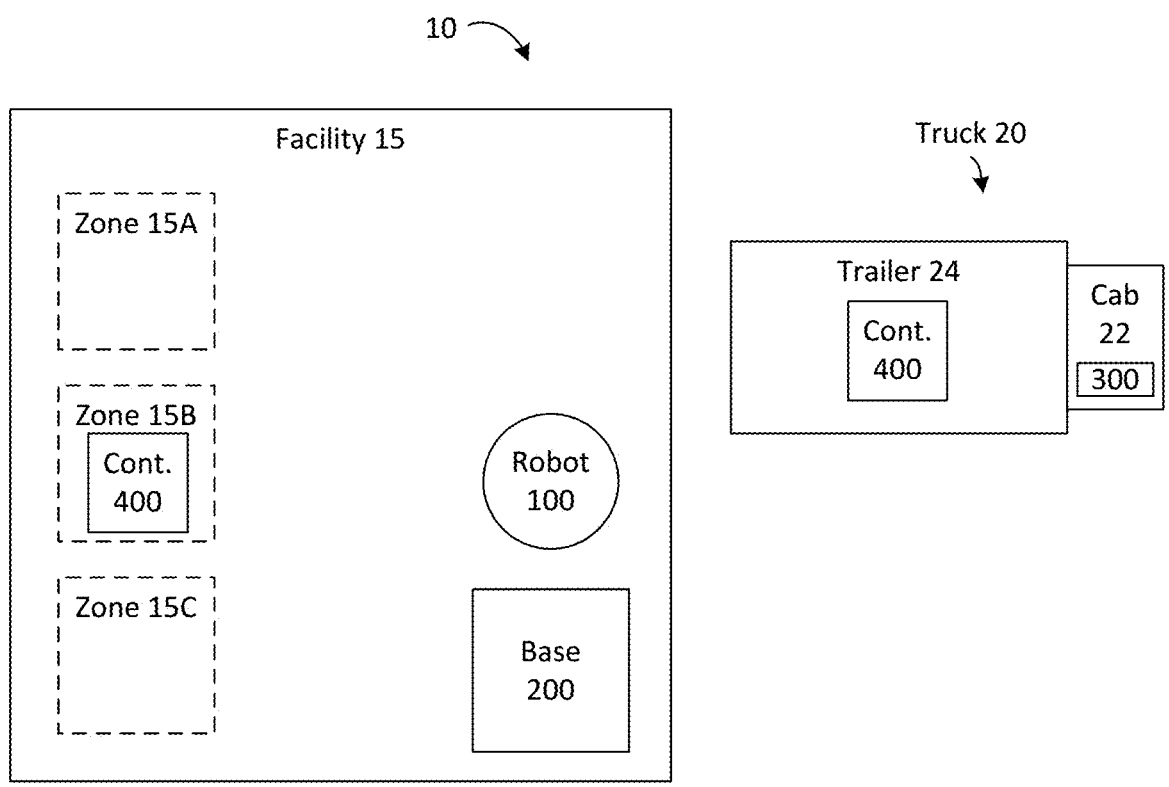
FIG. 1 is a diagram of an embodiment of a system for loading, unloading, and moving containers of items using an automated robot.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Systems, devices, and methods for automated unloading, loading, and moving of containers of items using automated robots are described herein. The systems may be deployed at facilities to automate loading and/or unloading containers of items from transport vehicles, such as airplanes, trains, semi-trucks, local delivery trucks, and others, and to automatically move the containers of items to and from desired locations within the facilities or elsewhere. The systems may include one or more automated robots that are configured to locate the containers, determine destinations for the containers, and move the containers to the determined destinations.

FIG. 1 is a diagram of an embodiment of a system 10 for loading, unloading, and moving containers 400 of items using automated robots 100. In the illustrated embodiment, the system 10 includes an automated robot 100, a base station 200, and a vehicle-based system 300. The automated robot 100 can be configured to load, unload, and move containers 400. The base station 200 can be, for example, a processor controlled system with configured to communicate with, control, and direct the automated robot 100. The vehicle-based system 300 can be, for example, a processor controlled system with a communication function configured to interact with the base station 200 and/or the automated robot 100. In some embodiments, the vehicle-based system 300 provides information to the base station 200 and/or the automated robot 100 about containers 400 to be loaded onto or unloaded from a truck 20. Embodiments of an automated robot 100 are shown in detail in FIGS. 2A-2B and described below. An embodiment of a base station 200 is shown in detail in FIG. 5, and an embodiment of a vehicle-based system 300 is shown in detail in FIG. 6. Although, only one automated robot 100, one base station 200, and one vehicle-based system 300 are illustrated, in some embodiments, more than one of each of these may be included in the system 10, or a plurality of systems 10 can be deployed at a facility 15. In some embodiments, a base station 200 is associated with a plurality of automated robots 100. In the illustrated embodiment, the system 10 is deployed at a facility 15. The facility 15 may be any location where containers 400 of items are unloaded from or loaded onto transport vehicles and/or any location where items are moved around between various locations within the facility. In some embodiments, the facility 15 is part of a distribution network, such as the United States Postal Service. In some embodiments, a distribution network may include processing facilities such as regional distribution facilities, hubs, and unit delivery facilities, or various other types of facilities. At each of these facilities, items are unloaded from or loaded into transport vehicles and moved between various locations within the facilities.

In the illustrated embodiment, the facility 15 includes three zones 15A, 15B, 15C, which represent zones or areas within the facility 15 to which containers 400 of items are to be delivered or from which containers 400 of items are to be sent. Although three zones 15A, 15B, 15C are illustrated, a facility 15 can include any number of zones and the distribution of zones within a facility 15 can vary depending on the particular application. A container 400 of items is illustrated at zone 15B. The container 400 may be a pallet or platform loaded with items, a crate or box containing items, a tray or stack of trays, or any other type of container (see, for example, FIGS. 3A-4B). The identity of the container can be determined or indicated in a container identifier, such as a label or tag on the container. The type of container can determine which type of automated robot, a number of automated robots, etc., are needed to move the specific type of container. For example, in the case of a small pallet or container, only a single automated robot may be needed to lift and move the container. In the case of a large pallet or similar container, two or four robots can be dispatched to stably lift the pallet. If the container is a shelving system, robots having clamping or other engagement mechanisms may be required to move the shelving system.

Although a single container 400 is illustrated at zone 15B, a plurality of containers 400 may be placed and/or staged at each zone 15A, 15B, 15C, or elsewhere in the facility 15. The items within the containers 400 can be parcels, packages, flats, letters, trays, bins, or any other type of item for distribution.

Also shown in FIG. 1, a truck 20, which includes a cab 22 and a trailer 24, is located at the facility 15. The truck 20 can pull up to a dock or loading area of the facility 15. For example, the truck 20 can back up to a loading dock such that containers 400 can be loaded onto or unloaded from the truck 20. A container 400 of items is illustrated in the trailer 24 of the truck 20. The truck 20 may include a plurality of containers 400 of items. The vehicle-based system 300 can be associated with the truck 20 and can provide, for example, information about the contents of the truck 20, a list or manifest of containers 400 to be unloaded from the truck 20, a list or manifest of containers 400 to be loaded onto the truck 20 from the facility 15, information about the origin location from the truck 20 (e.g., this truck is arriving from a particular location), information about a destination location for the truck 20 (e.g., this truck is bound for a particular location), and the like. In some embodiments, the vehicle-based system 300 is processor controlled device having a communicative function (e.g., wireless, cellular, etc.) located within the truck 20. In the illustrated embodiment, the vehicle-based system 300 is located in the cab 22 and can be accessed by a driver. Although one truck 20 is illustrated, the system 10 can also be used with other types and numbers of transport vehicles, such as planes, trains, local delivery trucks, etc. In general, a plurality of transport vehicles of many types can deliver and pickup containers 400 from the facility 15. In some embodiments, each transport vehicle can include a vehicle-based system 300.

In general, the system 10 is able to load and unload containers 400 from the truck 20 and/or to move containers 400 to and from the various zones 15A, 15B, 15C using one or more automated robots 100. In some embodiments, the automated robot 100 is substantially autonomous, such that it can pick up, move, and deliver containers 400 within the facility 15 and/or trailer 24 of the truck 20 substantially without human involvement or with minimal human involvement. In some embodiments, the base station 200 coordinates the movements of the automated robot 100. For example, the base station 200 may identify a current location of containers 400 as well as a desired location to which the container 400 is to be moved. The base station 200 may then instruct the automated robot 100 to move to the container 400, pick it up, and deliver it to the desired location, as will be described in greater detail below.

In some embodiments, the vehicle-based system 300 communicates to the base station 200 and/or the automated robot 100 information about the containers 400 in the truck 20, the items in the truck 20, and/or future destinations for the truck 20. In some embodiments, the vehicle-based system 300, the base station 200, and/or the automated robot 100 each include a communication module that permits communication over a network, such as a wireless network (LAN, WAN, Bluetooth etc.). In some embodiments, communication between the vehicle-based system 300 and the base station 200 and/or automated robot 100 is triggered when the truck 20 arrives at the facility 15. In some embodiments, this may occur automatically, for example, when the vehicle-base system 300 connects to a wireless network at the facility 15. In some embodiments, a driver of the truck 20 (or other operator, either of the truck 20 or facility 15) can signal that truck 20 has arrived. The automated robot 100 and/or the base station 200 can use the information received from the vehicle-based system 300 to determine appropriate movements for the containers 400. For example, when the truck 20 arrives at the facility 15, the vehicle-based system 300 may communicate to the base station 200 and/or the automated robot 100 that the trailer 24 an identifier for a dock location of the trailer 24. The vehicle-based system 300 may communicate to the base station 200 and/or the automated robot 100 container 400 (in the trailer 24 and at the identified dock location) is designated, for example, to be moved to zone 15A within the facility 15. In some embodiments, the vehicle-based system 300 may simply communicate that a container 400 (in the trailer 24) is designated for delivery to the facility 15, and the base station 200 can determine, by accessing a manifest database, a facility database, a tracking database, or other similar network resource which contains tracking, routing, and facility information, to which zone 15A, 15B, 15C the container 400 is to be delivered. The base station 200 may then instruct the automated robot 100 to move to the identified dock location, to the container 400, pick up the container 400, and move the container 400 to zone 15A where it can be deposited. As another example, the vehicle-based system 300 can be configured to communicate with the automated robot 100 and/or base station 200 about a future destination for the truck 20 and/or a one or more containers 400 that should be loaded onto the truck. In some embodiments, the vehicle-based system 300 can call one or more automated robots 100 to automatically load containers 400 onto the truck 20 (for example, an automated robot 100 can move the container 400 in zone 15B onto the truck 20). In some embodiments, the vehicle based system 300 can communicate to the base station 200 or to another system in or associated with facility 15, that the truck is available and the base station 200 can receive and send an instruction to the one or more automated robots 100 to pick up one or more containers 400 from locations within the facility 15 and to load them onto the trailer 24. In some embodiments, the base station 200 can instruct the automated robots 100 to load the one or more containers in a given order. For example, the container 400 from zone 15B may need to be loaded before the container 400 in zone 15C, because the container 400 from zone 15C may need to be unloaded first at the next destination, or the truck 20 may be delivering the two containers 400 to different facilities, and the container 400 from zone 15C is intended for a facility that is closer or sooner along the route than the other facility to which the other container 400 is to be delivered.

In another embodiment, the base station 200 can instruct the automated robot 100 to move containers 400 between the various zones 15A, 15B, 15C, at the facility. For example, the automated robot 100 can move the container 400 from zone 15B to zone 15C based on a sortation plan, based on a run plan for item processing equipment within the facility 15, based on the priority or delivery class of items within the containers 400, and the like.

In addition to communicating with the automated robot 100 and the vehicle-based system 300, the base station 200 may also communicate with additional systems (not illustrated) located at the facility 15 or elsewhere to coordinate the movement of containers 400. The additional systems may include run plans for equipment in the facility, delivery classes for items and containers 400, delivery instructions, tracking information, facility layout information, readers to identify the locations of containers 400 within the facility, and the like. For example, the base station 200 may communicate with a remote server regarding the current locations and destinations for each of the containers 400 and use this information to determine appropriate actions for the automated robot 100. In some embodiments, the base station 200 may be omitted, and the functions described above and below with reference to the base station 200 may be performed directly by the automated robot 100 itself.

These and other features of the system 10 will become more fully apparent from the detailed descriptions of the components of the system 10 that follow below as well as the descriptions of several examples. In some embodiments, the system 10 provides one or more advantages over existing systems for loading and unloading vehicles and moving containers at facilities.

Figure 2A:
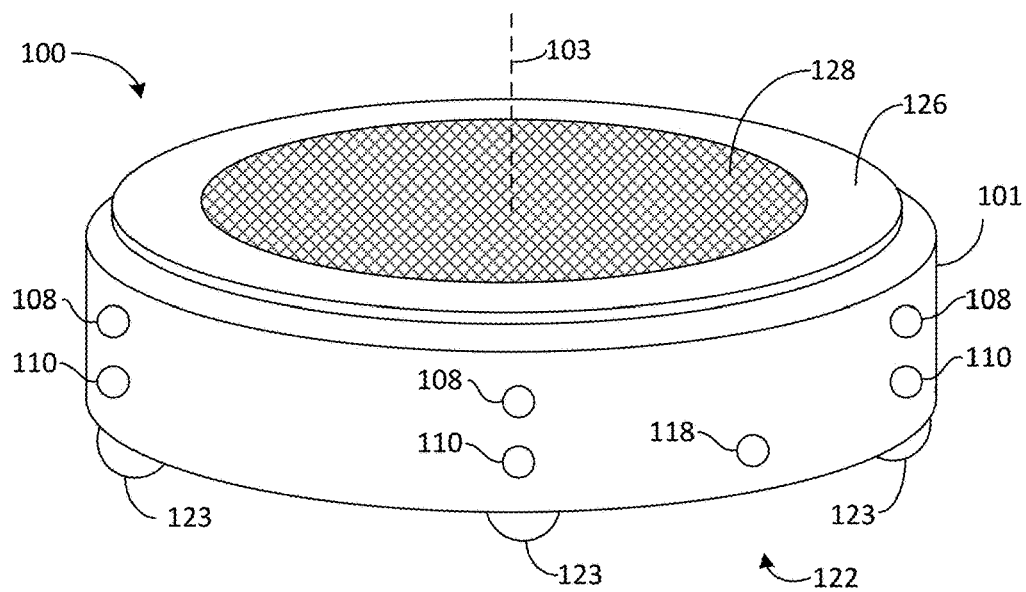
FIG. 2A is a perspective view of an embodiment of the automated robot of FIG. 1.
Figure 2B:
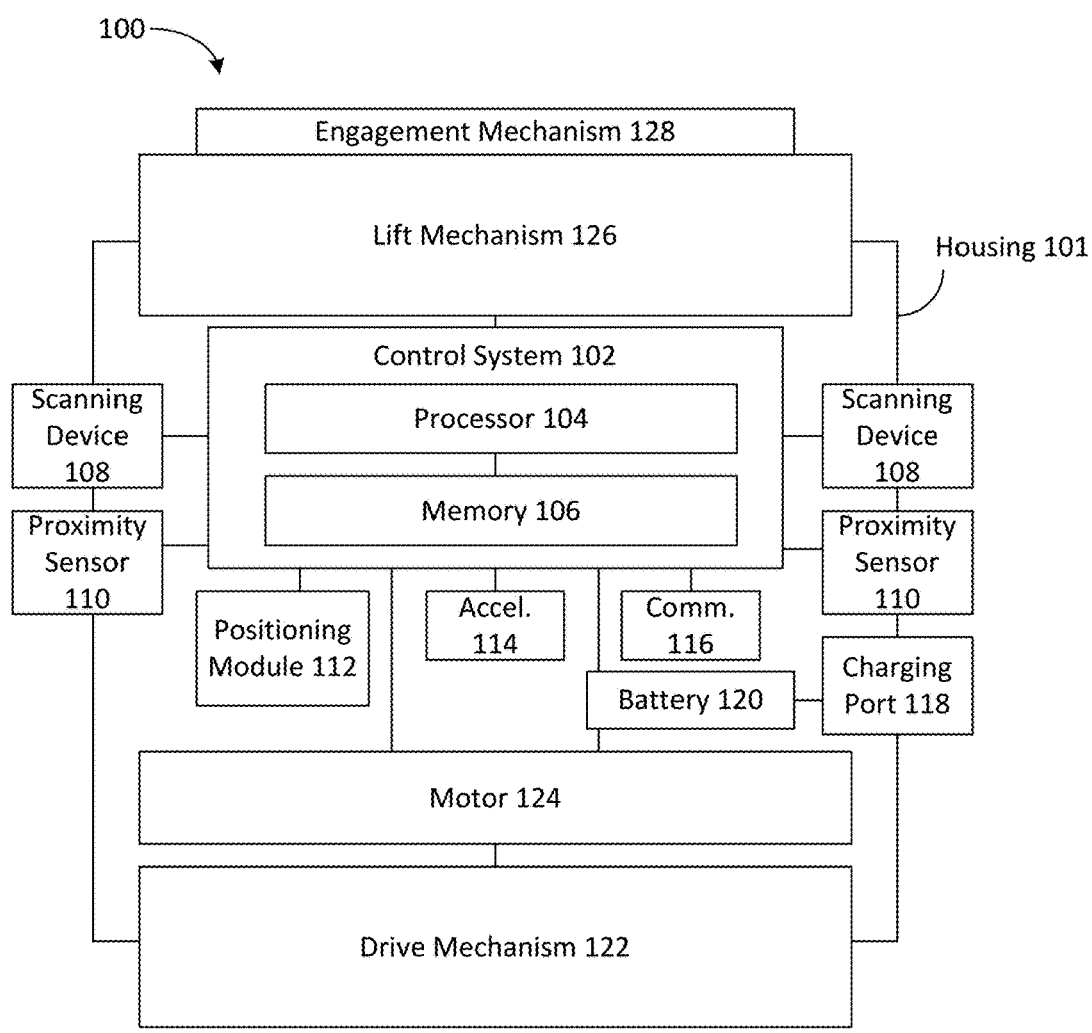
FIG. 2B is a block diagram of an embodiment of the automated robot of FIG. 2A.

FIG. 2A is a perspective view and FIG. 2B is a block diagram of an embodiment of an automated robot 100. The automated robot 100 includes a control system 102. The control system 102 is configured to control the operation of the automated robot 100. The control system 102 can be connected to a scanning device 108, a proximity sensor 110, a positioning module 112, an accelerometer 114, a communication module 116, a motor 124, and/or a drive mechanism 122. In the illustrated embodiment, the control system 102 includes a processor 104 and a memory 106. In some embodiments, the control system 102 can include a plurality of processors 104, a plurality of memories 106, as well as other devices, such as storages (e.g., hard disk drives, solid state drives, etc.). The memory 106 can store instructions that can be executed by the processor 104 to control the operation of the automated robot 100.

Figure 3A:
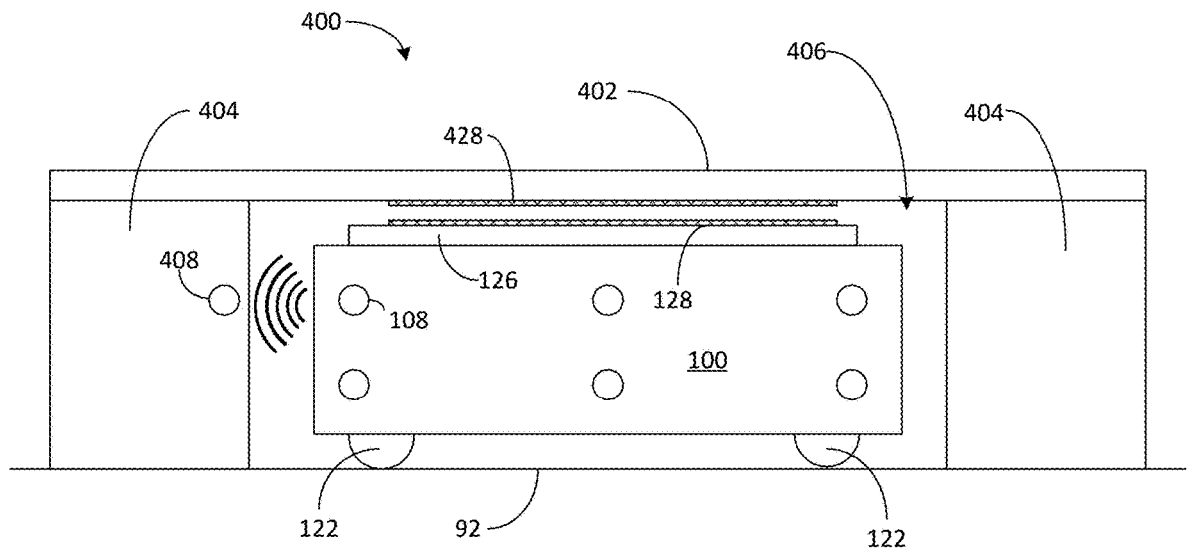
FIG. 3A illustrates the automated robot of FIG. 2A positioned beneath an embodiment of a container.
Figure 3B:
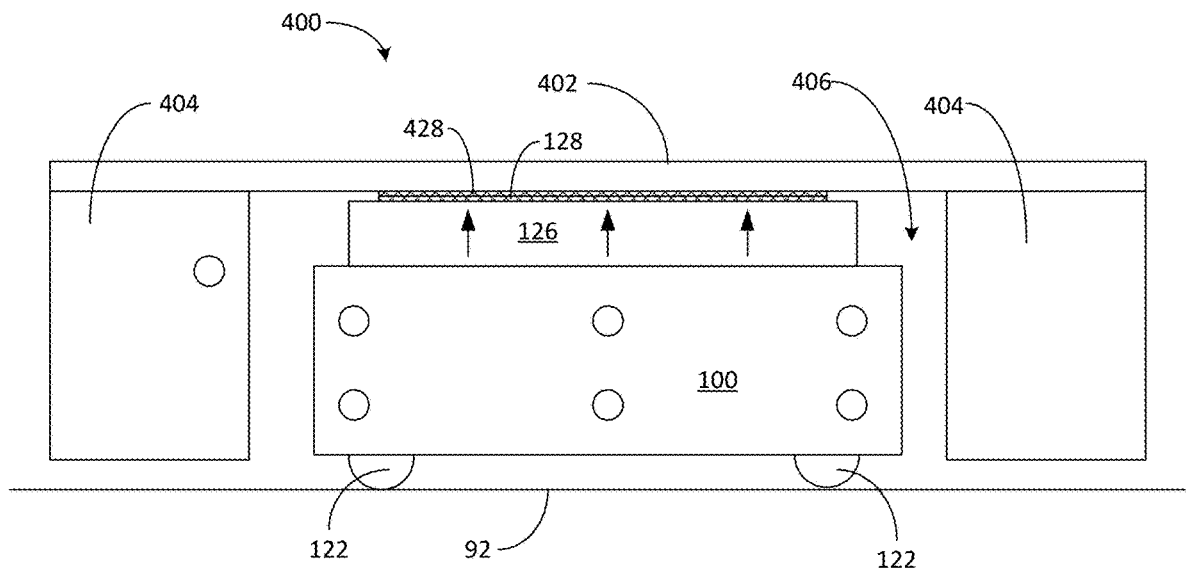
FIG. 3B illustrates the automated robot of FIG. 2A lifting the container of FIG. 3A.

In the illustrated embodiment of FIG. 2A, the automated robot 100 has a substantially cylindrical housing 101. In some embodiments, the housing 101 is less than 18 inches tall, less than 15 inches tall, less than 12 inches tall, less than 10 inches tall, less than 8 inches tall, or less than 6 inches tall, although other heights (larger and smaller) are possible. In some embodiments, the housing 101 is configured such that the automated robot 100 has a diameter that is less than 30 inches, less than 24 inches, less than 18 inches, less than 15 inches, or less than 12 inches, although other diameters (larger and smaller) are possible. Although a cylindrical housing 101 is illustrated, other shapes for the housing 101 are possible, for example, square or rectangular. In some embodiments, for example, as shown in FIGS. 3A and 3B, the housing 101 is configured such that the automated robot 100 can fit beneath a container 400 to lift the container 400.

The automated robot 100 includes a drive mechanism 122. The drive mechanism 122 is configured to allow movement of the automated robot 100. For example, in some embodiments, the drive mechanism 122 is configured to provide a force to move the automated robot 100 forward and to turn (for example, pivot around central axis 103). In some embodiments, the drive mechanism 122 is bi-directional, such that the automated robot 100 can move forwards and backwards, as well as turn. In some embodiments, the automated robot 100 has a multi-directional drive mechanism 122 such that it can move forwards, in many directions, such as backwards, left, and right, and/or turn. As shown in FIG. 2B, the drive mechanism 122 can be connected to a motor 124 that drives the drive mechanism. In some embodiments, the motor 124 is an electric motor. In some embodiments, the autonomous robot 100 can include a plurality of motors 124.

In the illustrated embodiment of FIG. 2A, the drive mechanism 122 includes a plurality of wheels 123. In some embodiments, the drive mechanism 122 comprises two, three, four, or more wheels 123. In some embodiments, one or more of the wheels 123 can be driven by the motor 124 or plurality of motors. Other types of drive mechanisms 122 can also be used. For example, as shown in the embodiment of FIG. 2C, the drive mechanism 122 can include two continuous tracks or treads. The continuous tracks or treads can be operated together and in the same direction to move the autonomous robot 100 forwards and/or backwards, and can be operated independently, or in opposite directions to turn or pivot the autonomous robot 100.

In the illustrated embodiment of FIG. 2A, the drive mechanism 122 extends from a lower surface of the housing 101. In some embodiments, the drive mechanism 122 can be mounted on one or more side surfaces of the housing 101, and/or the lower surface of the housing 101.

The autonomous robot 100 also includes a lift mechanism 126. The lift mechanism 126 is configured to lift a container 400 so that the container 400 can be carried by the autonomous robot 100 (for example, as described below with reference to FIGS. 3A and 3B). In some embodiments, the lift mechanism 126 extends from a top surface of the housing 101. The automated robot 100 is configured to raise and lower the lift mechanism 126 to lift containers 400. The lift mechanism 126 can be a scissor jack, screw jack, hydraulic jack, pneumatic jack, or any other type of lifting device. In some embodiments, the autonomous robot 100 includes a scissor jack lift mechanism 126.

In the illustrated embodiment of FIG. 2A, the lift mechanism 126 also includes an engagement mechanism 128. The engagement mechanism 128 can be configured to engage with corresponding structure on a container 400 to secure the container 400 to the automated robot 100. In some embodiments, the engagement mechanism 128 includes grooves or slots that engage with corresponding ribs or rails on a container 400. In some embodiments, the engagement mechanism 128 includes a textured or high friction surface that engages a corresponding surface on a container 400. In some embodiments, the engagement mechanism 128 comprises one or more clamps (not shown) that attach to the container 400. In some embodiments, the engagement mechanism 128 can pivot around the axis 103 with respect to the lift mechanism 126 or the housing 101.

In some embodiments, the automated robot 100 also includes one or more scanning devices 108. The scanning device 108 can be configured to scan (or otherwise receive data or information from) labels or sensors located on the containers 400. For example, a container 400 may include a label that identifies the container 400, and the autonomous robot 100 can scan the label using one or more of the scanning devices 108 before moving the container 400 to verify the container 400 or to determine a destination for the container 400. The scanning device 108 may be an optical device, a camera, a 2-D or 3-D barcode reader, an RFID reader, a Bluetooth sensor, or any other type of scanning device. For example, the scanning device 108 can be a camera that captures images of labels and extracts information from the images using optical character recognition (OCR).

In the illustrated embodiment of FIG. 2A, the automated robot 100 includes a plurality of scanning devices 108 positioned on various sides of the housing 101. In some embodiments, this may allow the automated robot 100 to scan labels or sensors of containers 400 on all sides of the automated robot 100. In some embodiments, the automated robot 100 includes a single scanning device 108 positioned on the front of the automated robot 100.

The automated robot 100 also includes one or more proximity sensors 110. The automated robot 100 can use the proximity sensors 110 to avoid colliding with objects as the automated robot 100 moves around. For example, in some embodiments, the proximity sensors 110 can detect objects in the path of the automated robot 100. The automated robot 100 can then determine an alternate path to avoid collision with the objects, for example, as described with reference to FIG. 8 below. In some embodiments, the proximity sensors 110 can be used to align the automated robot 100 with respect to a container 400 that the automated robot 100 is to move. In some embodiments, the container 400 has a corresponding sensor or reflector, etc., with which the automated robot 100 aligns.

In the illustrated embodiment of FIG. 2A, the automated robot 100 includes a plurality of proximity sensors 110 positioned on various sides of the housing 101. In some embodiments, the automated robot 100 includes a single proximity sensor 110 positioned on the front of the automated robot 100.

In some embodiments, the automated robot 100 includes a charging port 118. The charging port 118 can be positioned on the housing 101. As illustrated in FIG. 2A, the charging port 118 is positioned on a side surface of the housing 101, although other locations for the charging port 118 are possible. The charging port 118 is configured for charging a battery 120 (as shown in FIG. 2B). In some embodiments, the automated robot 100 can include a plurality of batteries 120. The battery 120 can power the motor 124 and/or the electronics of the automated robot 100.

As shown in the block diagram of FIG. 2B, the automated robot 100 also includes a positioning module 112 and an accelerometer 114. The positioning module 112 is configured to provide location information about the position of the automated robot 100 using sensors, odometers, triangulation within the facility 15, GPS and the like. The positioning module 112 can be a GPS module or any other module or device for providing positioning or location information regarding the automated robot 100. In some embodiments, the proximity sensors 110 can include tags, emitters, beacons, etc., that can interact with systems within the facility 15, such as a mesh network, in order to identify the exact or specific location of the automated robot 100 within the facility. The location information can be used to plan routes or paths for the automated robot 100. The accelerometer 114 can be configured to provide information about the movement of the automated robot 100. In some embodiment, data from the accelerometer 114 is used in conjunction with date from the positioning module 112 to track the movements of the automated robot 100 to determine a location in the facility of the automated robot based on the recorded movements, speed, revolutions of wheels, turn instructions, etc. The path of the automated robot 100 can be determined and stored in the base station 200 or in another system in the facility 15.

The automated robot 100 can also include a communication module 116, for example, as shown in FIG. 2B. The communication module 116 can allow the automated robot 100 to communicate with other devices, such as the base station 200 and/or the vehicle-based system 300. In some embodiments, the communication module 116 is configured for wireless communication, for example, using Wi-Fi, Bluetooth, cellular (e.g., 3G, 4G, LTE, etc.) or any other wireless communication protocol.

FIG. 3A illustrates the automated robot 100 of FIG. 2A positioned beneath an embodiment of a container 400. In the illustrated embodiment, the container 400, such as a pallet or similar device, can include a platform 402 and legs 404. Items can be placed on the platform 400. Legs 404 rest on the ground 92, such as the floor of the trailer 24 or floor of the facility 15, and support the platform 402. The legs 404 can be disposed apart from each other to create a space 406. The automated robot 100 can be configured in size and shape to fit within the space 406, as shown in FIG. 3A.

In some embodiments, the automated robot 100 uses scanning device 108 to scan a label or sensor 408 on the container 400. The sensor 408 can be a passive sensor. In some embodiments, the sensor 408 is an RFID tag. In some embodiments, the sensor 408 is a 2-D or 3-D barcode. From the information received from the scan, the automated robot 100 can verify that it is preparing to move the correct container 400 or determine a destination for the container 400. In some embodiments, the automated robot 100 processes the scan information itself. In some embodiments, the automated robot 100 communicates the scan information to another device, such as the base station 200.

To lift the container 400, the automated robot 100 may guide itself into the space 406. The automated robot 100 may align the engagement structure 128 on the lifting mechanism with a corresponding engagement structure 428 of the container 400. The engagement structure 428 can be positioned on an underside of the platform 402. As shown in FIG. 3B, the automated robot 100 can then extend the lifting mechanism 126. The lifting mechanism 126 can cause the engagement mechanism 128 to engage the engagement mechanism 428. The lifting mechanism 126 can continue to extend until the legs 404 are lifted off the ground 92. In this configuration, the automated robot 100 can move the container 400 to its destination. To deposit the container 400, the automated robot 100 may lower the lifting device 126 until the legs 404 of the container 400 rest again on the ground 92. The automated robot 100 can then exit the space 406.

In some embodiments, the container 400 can be configured to be moved by a single automated robot 100. In some embodiments, multiple automated robots 100 are used together to lift and move a single container 400. For example, a container 400 can include multiple spaces 406, each configured to receive an automated robot 100. The automated robots 100 can then lift and drive in unison to move the container 400.

Figure 4A:
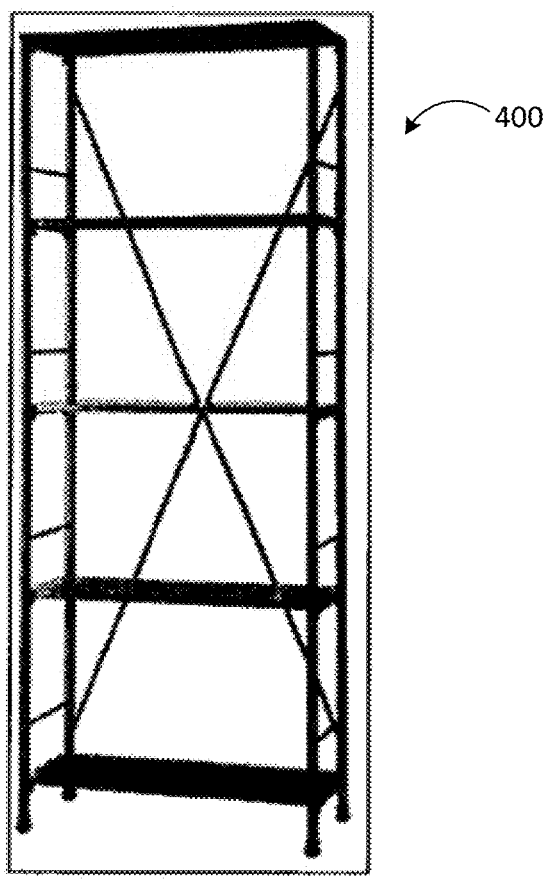
FIG. 4A is a perspective view of an embodiment of set of shelves.
Figure 4B:
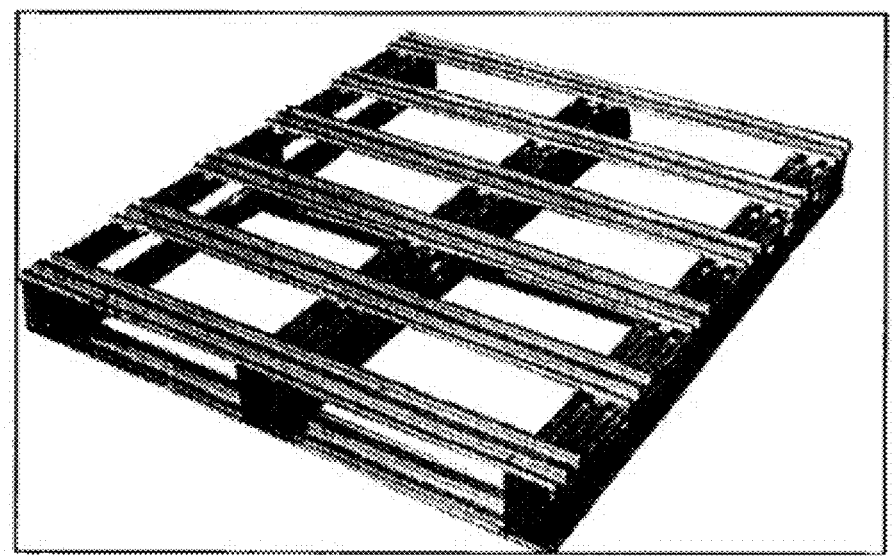
FIG. 4B is a perspective view of an embodiment of a pallet.

Although illustrated as a platform 402 supported by legs 404, like a pallet, the container 400 described herein can be of many forms without departing from the scope of this disclosure. For example, FIG. 4A is a perspective view of an embodiment of a set of shelves that can be used as the container 400. One or more automated robots 100 can maneuver underneath the set of shelves 400, engage the bottom portion of the set of shelves 400 with an engagement mechanism 128, such as a clamp, and lift and transport the set of shelves 400. FIG. 4B is a perspective view of an embodiment of a pallet that can be used as the container 400.

Figure 5:
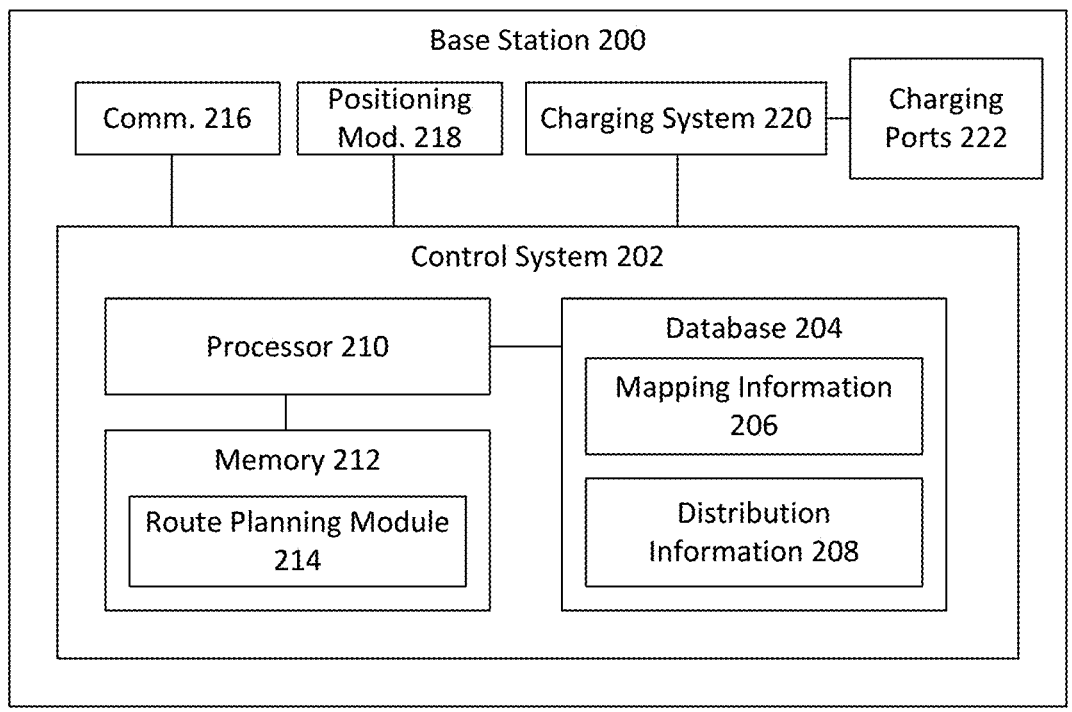
FIG. 5 is a block diagram of an embodiment of a base station that can be used with the system of FIG. 1.

FIG. 5 is a block diagram of an embodiment of a base station 200 that can be used with the system 10 of FIG. 1. In some embodiments, the base station 200 is associated with and coordinates the movements of one or more automated robots 100.

The base station 200 includes a communication module 216. The communication module 216 can allow the base station 200 to communicate with other devices, such as the automated robots 100 and/or the vehicle-based system 300. In some embodiments, the communication module 216 is configured for wireless communication, for example, using Wi-Fi, Bluetooth, cellular (e.g., 3G, 4G, LTE, etc.) or any other wireless communication protocol.

In some embodiments, the base station 200 includes a positioning module 218. The positioning module 218 can be configured to provide location information about the position of the base station 200 and the automate robot 100 using sensors, odometers, triangulation within the facility 15, GPS and the like. The location information can be used to identify the locations of automated robots 100 within the facility 15, and to guide automated robots 100 back to the base station 200, for example.

In the illustrated embodiment, the base station 200 includes a charging system 220 that is connected to one or more charging ports 222. Each of the charging ports 222 of the base station 200 can be selectively connected to a charging port 118 of an automated robot 100 to charge the battery 120. In some embodiments, a plurality of automated robots 100 can dock with the base station 200, and, when the automated robots 100 are docked with the base station 200, the charging ports 222 engage the charging ports 118 so that the automated robots 100 charge while docked. In some embodiments, charging may be wireless or inductive. For example, the charging ports 222 can be replaced with wireless charging pads that are configured to charge the batteries 118 of automated robots 100 when the automated robots are positioned on the charging pads.

The communication module 216, positioning module 218, and charging system 220 are connected to a control system 202. In the illustrated embodiment, the control system 202 includes a processor 210, a memory 212, and a storage or database 204. The processor 210 can be connected to the memory 212 and the storage or database 204. In some embodiments, the database 204 stores mapping information 206 and distribution information 208. Mapping information 206 may include a map of the facility and/or distribution network and may provide data to the processor 210 that is used in planning/coordinating paths for automated robots 100. Distribution information 208 may include information relating to the various facilities on the distribution network, the current locations of containers 400 being processed through the distribution network, as well as their origin and final destination information, the locations and routes of transport vehicles, etc. The processor 210 may access and use the distribution information 208 in coordinating the actions of the automated robots 100. In some embodiments, the distribution information 208 can be an access point or communication link with other facility databases or systems which include container, item, processing equipment, etc., information.

The memory 212 may store instructions that configure the processor 210 to perform functions that control the base station 200. For example, in the illustrated embodiment, the memory 212 stores a route planning module 214. The route planning module 214 may include instructions that configure the processor 210 to plan paths or routes for automated robots 100. The paths or routes may be based on information stored in the database 204. The routes or paths can be communicated to the automated robots 100 by the communication module 216. The route planning module 214 can plan routes to optimize speed of unloading a truck 20, to avoid collisions between automated robots 100 or other items or people at the facility 15, to optimize space usage within the facility 15, and the like.

Although the base station 200 is described herein as a particular component, for example, with reference to FIG. 5, it will be understood that the term base station and the description of the components is not limited to that particular component which charges the automated robots 100. The functionality described herein for the components of the base station, for example, the processor 210, the database 204, etc., can be embodied on separate computer systems in communication with the base station 200. In some embodiments, the facility may include a hub, server, or system which communicates with the base station 200 and the vehicle-based systems 300, and with other systems and databases in order to perform or carry out the operations described herein. In some embodiments, the hub or server may perform many of the operations comprised herein with regard to the base station 200. The base station 200 may simply be a charging port or docking location for the one or more automated robots 100, and the automated robots can receive instruction from the hub or server directly, or from the base station 200 which receives the instructions from the server or hub.

Figure 6:
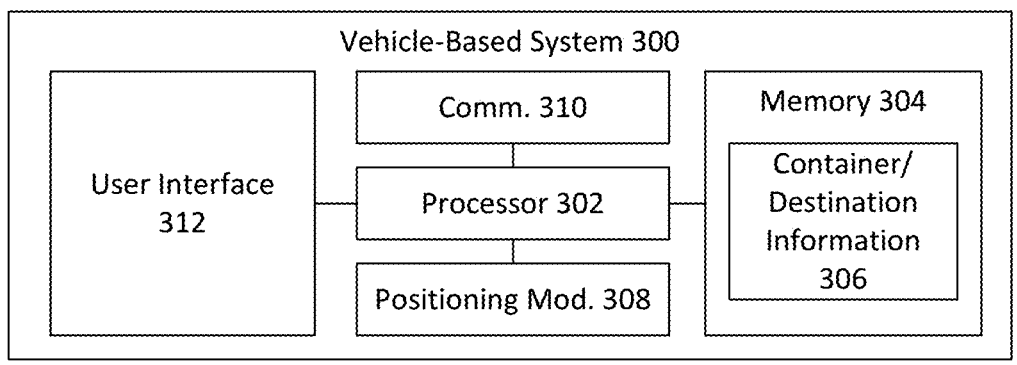
FIG. 6 is a block diagram of an embodiment of a vehicle-based system that can be used with the system of FIG. 1.

FIG. 6 is a block diagram of an embodiment of a vehicle-based system 300 that can be used with the system 100 of FIG. 1. In some embodiments, the vehicle-based system 300 is installed in transport vehicles, such as the truck 20, of FIG. 1, and communicates information about the containers 400 and/or future destinations of the transport vehicle to the base station 200 and/or automated robots 100. In some embodiments, the vehicle-based system 300 is installed in the cab 22 of truck 20, so as to be accessible by a driver. In some embodiments, the vehicle-based system 300 is installed in the trailer 24 of the truck 20.

In the illustrated embodiment, the vehicle-based system 300 includes a processor 302, connected to a memory 304, a positioning module 308, a communication module 310, and a user interface 312. In some embodiments, the memory 304 stores container/destination information 306. The container/destination information 306 can include a manifest. The manifest can include a list of containers 400 currently on the truck 20. In some embodiments, the manifest also includes delivery destinations for the containers 400. In some embodiments, the manifest also identifies the specific location of one or more of the containers 400 on the truck 20. In some embodiments, the manifest includes a list of containers 400 that need to be loaded onto the truck 20. In some embodiments, the manifest includes a list of future destinations to which the truck 20 will travel. The positioning module 308 is configured to provide location information about the position of the vehicle-based system 300, the truck 20, and/or the containers 400 loaded thereon. The processor 302 can control the communication module 310 to send information obtained from the memory 304 (e.g., the container/destination information 306) and/or the positioning module 308 to other devices, such as the base station 200 and/or automated robots 100. In some embodiments, the communication module 310 also receives information from the other devices. In some embodiments, the communication module 310 is configured for wireless communication, for example, using Wi-Fi, Bluetooth, cellular (e.g., 3G, 4G, LTE, etc.) or any other wireless communication protocol.

The vehicle-based system 300 also includes a user interface 312. The user interface 312 can allow an operator (for example, a driver of the truck or a worker at the facility) to interact with the system 10. For example, in some embodiments, the user interface 312 includes a button. When the truck 20 arrives at facility 15, the driver may press the button to initiate automated loading and unloading of the truck 20. In some embodiments, the interface comprises a keyboard, display, mouse, touchscreen, or other type of interface to allow interaction with the system 10. Or, when the truck 20 arrives at the facility 15 unloading may be initiated automatically based on a position of the truck 20, connection to a wireless network at the facility 15, or the like. Once initiated, the vehicle-based system 300 can communicate with the base station 200 and/or automated robot 100. For example, the vehicle-based system 300 can transmit a manifest to the base station 200, which can then direct the automated robots 100 in the process of loading and/or unloading the truck 20.

FIGS. 7A-7E illustrate an example of unloading two containers C1, C2 from a truck 20 at a facility 15 using an embodiment of system 10 that includes two automated robots R1, R2, a base station 200, and a vehicle-based system 300. The automated robots R1, R2 can be substantially similar to the automated robots 100 described above. The containers C1, C2 can be substantially similar to the containers 400 described above. Although this example describes unloading truck 20, it will be understood that the system 10 can also be used to load transport vehicles and move containers between various zones in the facility.

Figure 7A:
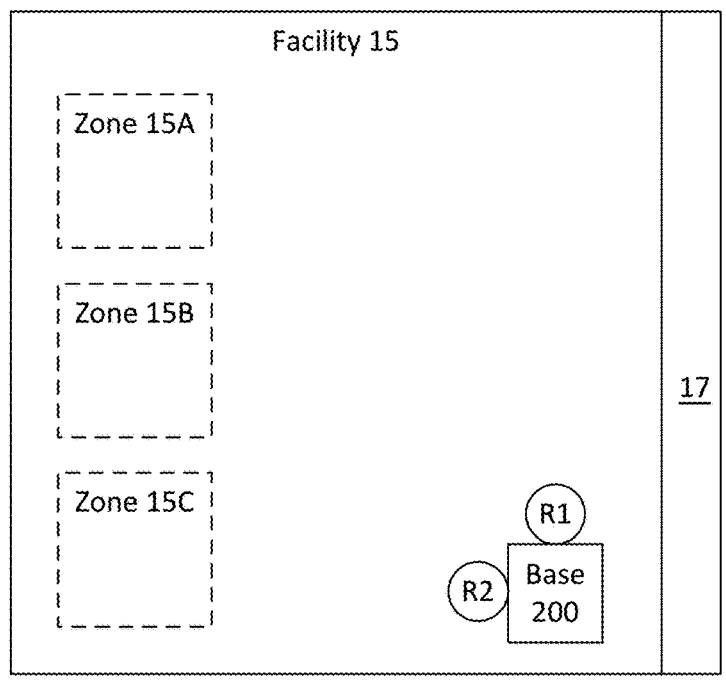
FIGS. 7A-7F illustrate an example of unloading a truck at a facility using an embodiment of a loading and unloading system that includes automated robots.

FIG. 7A illustrates the facility 15. The facility 15 includes three zones 15A, 15B, 15C. Each zone 15A, 15B, 15C represents an area within the facility 15 to which containers can be delivered. In some embodiments, each zone 15A, 15B, 15C corresponds with a delivery destination, such as a zip code, another facility, an address, a group of addresses, etc. in some embodiments, each zone can represent an area of the facility where different processes occur. For example, zone 15A may be proximate item processing equipment, such as item sorting equipment. Zone 15B may be a location on the dock where a container is staged prior to being loaded onto another vehicle. Zone 15C may be another area where other actions can be performed with the facility 15. The facility 15 also includes a loading dock 17. Transport vehicles can arrive at the loading dock 17 to unload containers. As shown in FIG. 7A, a base station 200 and two automated robots R1, R2 are deployed at the facility 15. The automated robots R1, R2 are shown docked with the base station 200. When docked, the base station 200 may charge the automated robots R1, R2. The automated robots R1, R2 may return to the base station 200 when not moving containers.

Figure 7B:
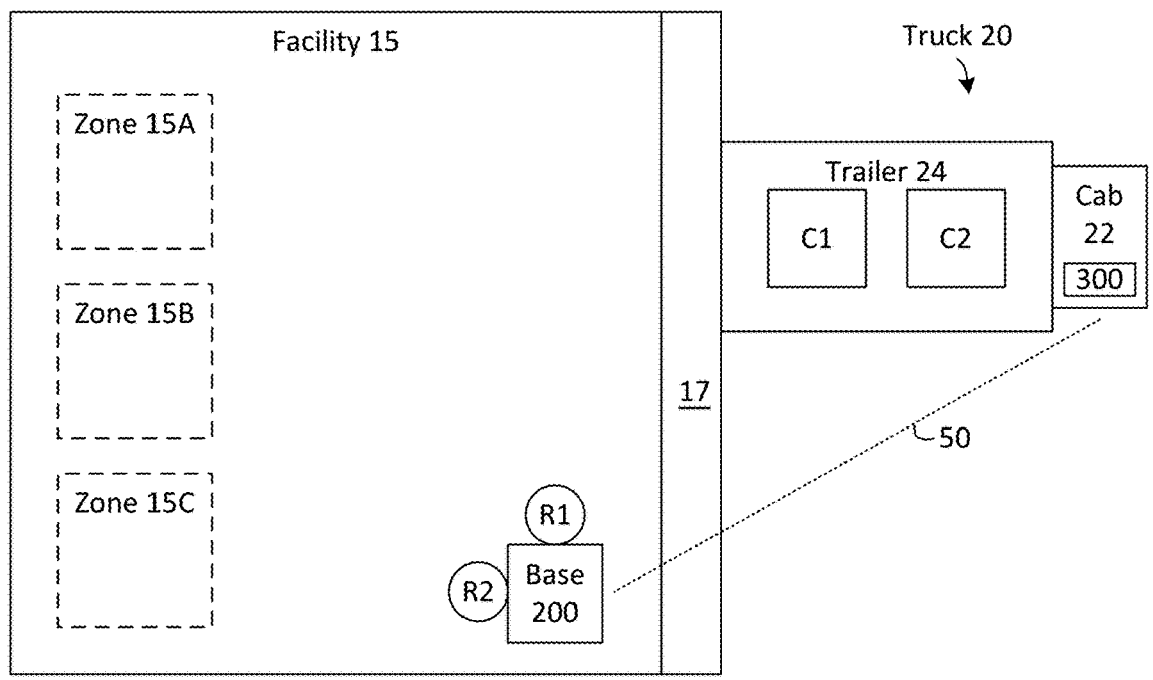

In FIG. 7B, the truck 20 has arrived at the facility 15 and is shown backed to the loading dock 17. The truck 20 includes a cab 22 and a trailer 24. A vehicle-based system 300 is installed in the cab 22. Two containers C1, C2 are currently in the trailer 24. The truck 20 can communicate via the vehicle based system 300 that the truck is at dock location 1. In some embodiments, the facility can include a sensor which detects the presence of the trailer 24 at dock location 1 and communicates this information to the base station. The vehicle based system 300 can send a manifest or list of identifiers for containers C1 and C2. In some embodiments, the vehicle based system can send item information or specific instructions to the base station 200. In some embodiments, the base station 200 or other system can receive the identifiers for containers C1 and C2. The base station 200 or a connected system can access a routing or tracking database or can otherwise obtain information regarding the next event or destination for the containers C1 and C2.

In this example, the container C1 is destined item sortation or further item processing. The container C1 may be broken down (that is, may have items unloaded from it and the container object will no longer exist), for sortation or processing in item processing equipment. The base station 200 can identify that zone 15A is the assigned zone for container C1. Container C2 may be intended for loading onto a truck for another destination, such as a unit delivery facility or a post office, without being broken down. The base station 200 or other system can determine that container C2 should be moved to zone 15C.

The vehicle-based system 300 may store information about the containers C1, C2. For example, the vehicle-based system 300 can store a manifest indicating that the tuck is carrying the containers C1, C2. In some embodiments, the manifest may indicate the position of the containers C1, C2 within the trailer 24. In some embodiments, the manifest may also indicate that the container C1 is destined for delivery to zone 15A and the container C2 is destined for delivery to zone 15C. In some embodiments, the manifest may indicate only that containers C1 and C2 are present on the truck 20. The base station 200 may then determine whether the containers C1 or C2 should be unloaded and determine the appropriate zone 15A, 15B, 15C to which the containers C1, C2 should be delivered.

When the truck 20 arrives at the loading dock 17, the vehicle-based system 300 establishes a communication link 50 with the base station 200. In some embodiments, the link 50 is established automatically when the vehicle-based system 300 connects to a communication network present at the facility 15. In some embodiments, the link 50 is established when the positioning module 308 of the vehicle-based system 300 indicates that the truck 20 has arrived at the facility, or when the truck 20 comes within a predefined proximity of the facility 15. In some embodiments, a driver of the truck 20 initiates the link 50 by, for example, pressing a button on a user interface of the vehicle-based system 300. The vehicle-based system 300 may relay information about the containers C1, C2 and/or information about the location of the truck 20 to the base station 200. For example, the vehicle-based system 300 may communicate to the base station 200 that truck 200 is present at the loading dock and currently holds containers C1, C2 for delivery to zones 15A, 15C, respectively. In some embodiments, the base station 200 is omitted, and the vehicle-based system 300 establishes communication link 50 with the automated robots R1, R2.

Figure 7C:
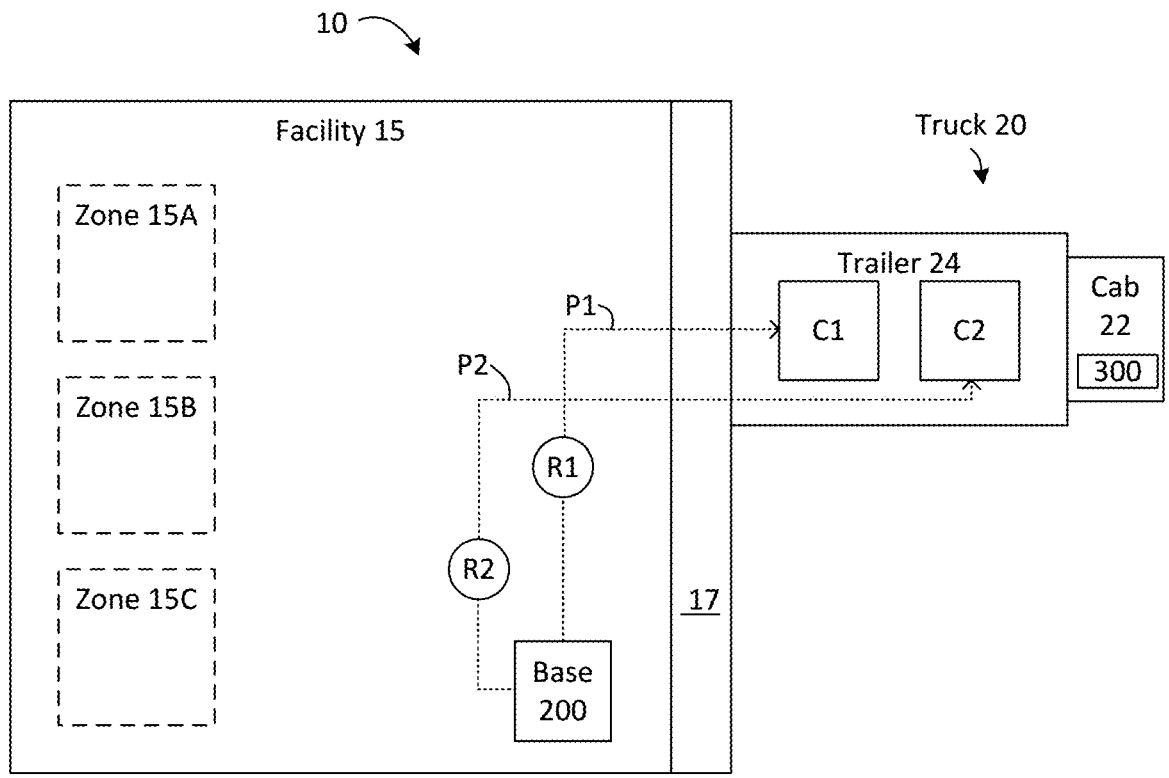

In FIG. 7C, the base station 200 dispatches automated robots R1, R2 to unload the containers C1, C2 from the truck 20. The base station 200 may plan paths P1, P2 for the automated robots R1, R2 that guide the automated robots R1, R2 to the containers C1, C2. The automated robots R1, R2 are configured to follow paths P1, P2. As will be described with reference to FIG. 8 below, in some embodiments, automated robots R1, R2 may deviate from paths P1, P2 to avoid obstacles in the paths P1, P2. In some embodiments, paths P1, P2 are planned by the automated robots R1, R2. In some embodiments, the specific location of the containers C1, C2 within the trailer 24 is not known and the paths P1, P2 guide the automated robots R1, R2 to the trailer 24 rather than to the containers C1, C2. When the automated robots R1, R2 enter the trailer 24, they may begin to scan all the containers in the trailer 24 until containers C1, C2 are located. In some embodiments, the automated robots R1 and R2 can scan each container to scan a label on the containers C1 and C2. In some embodiments, the automated robots can interrogate labels or tags on the containers C1 and C2 in order to activate the tag or label on the containers, such as an RFID tag, or the like.

Figure 7D:
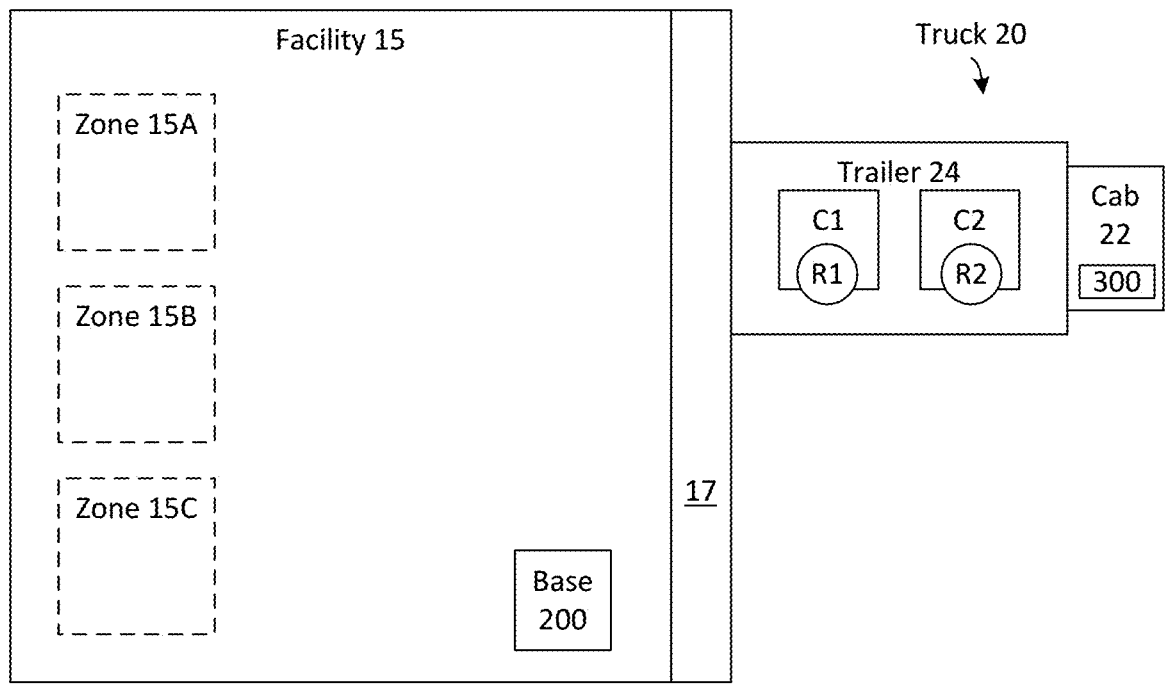

In FIG. 7D, automated robot R1 picks up the container C1 and automated robot R2 picks up the container C2. In some embodiments, the automated robots R1, R2 scan labels or sensors on the containers to ensure that the correct containers C1, C2 are picked up. In some embodiments, information obtained from the scans is communicated back to the base station 200. In some embodiments, information about the scan is stored to indicate that the container C1, C2 have been picked up by robots R1, R2. For example, the scan information may be stored in a log.

Figure 7E:
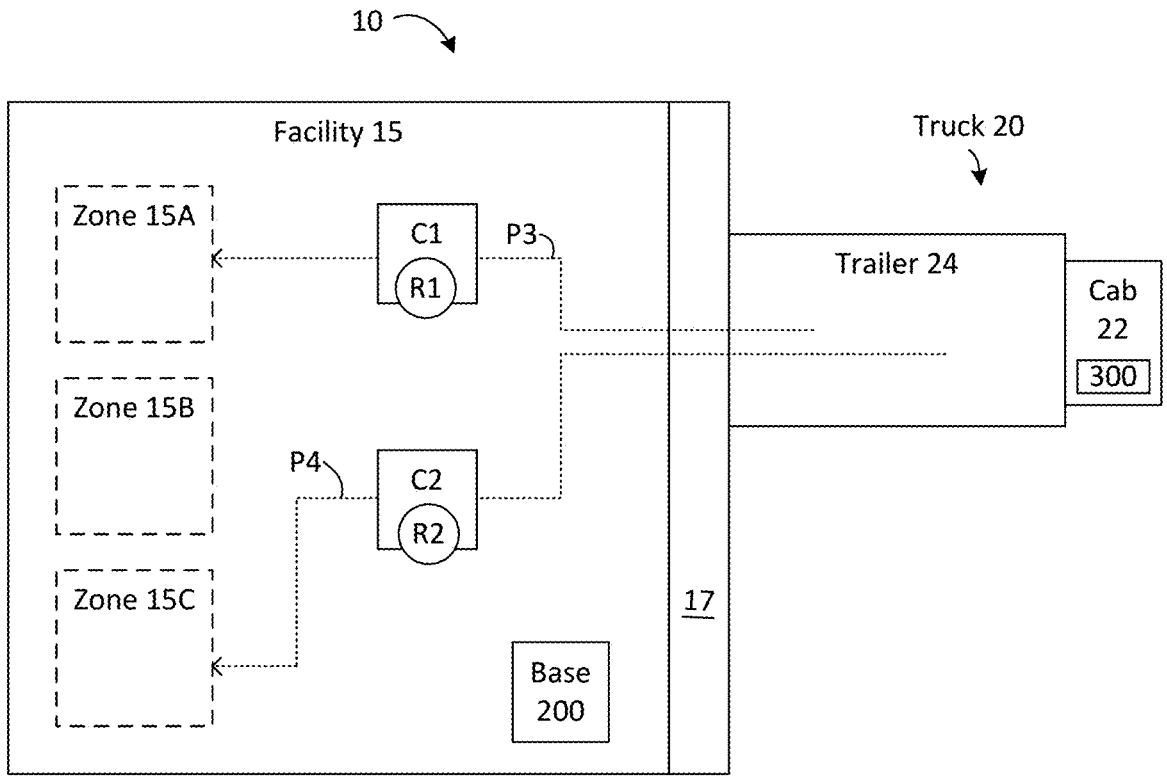

In FIG. 7E, the automated robots R1, R2 carry the containers C1, C2 along paths P3, P4 to their destinations. Paths P3, P4 may be planned by the base station 200 or the automated robots R1, R2. As before, the automated robots R1, R2 may deviate from paths P3, P4 to avoid obstacles. In the illustrated embodiment, automated robot R1 moves along path P3 to zone 15A and automated robot R2 moves along path P4 to zone 15C.

Figure 7F:
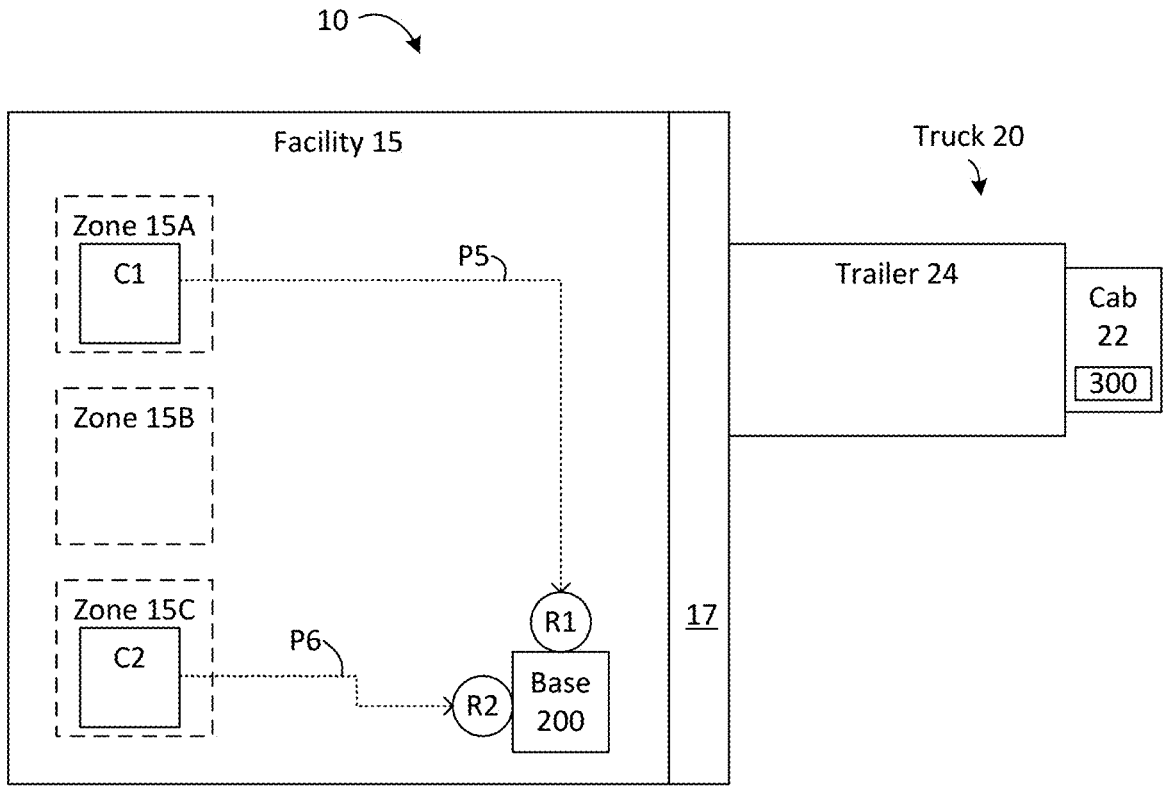

In FIG. 7F, after depositing containers C1, C2 in zones 15A, 15C, automated robots R1, R2 return to the base station 200 along paths P5, P6. In some embodiments, the automated robots R1, R2 may scan the containers C1, C2 again when they are deposited to indicate that the containers C1, C2 have been delivered. Again, a log may be updated and/or scan events can be recorded for the containers C1 and C2. These events can be stored in a tracking log for the containers, and the events can be associated with the items contained within the containers. Paths P5, P6 may be planned by the base station 200 or the automated robots R1, R2. As before, the automated robots R1, R2 may deviate from paths P5, P6 to avoid obstacles. When the automated robots R1, R2 arrive at base station 200, they may dock with the base station 200 to recharge. In some embodiments, instead of returning to the base station 200, the automated robots R1, R2 may be rerouted to other containers. In some embodiments, the robots R1, R2 will both lift container C1 together and jointly move it to zone 15A. Then the robots R1, R2 can move to container C2, lift it together, and jointly move it to zone 15C.

Figure 8:
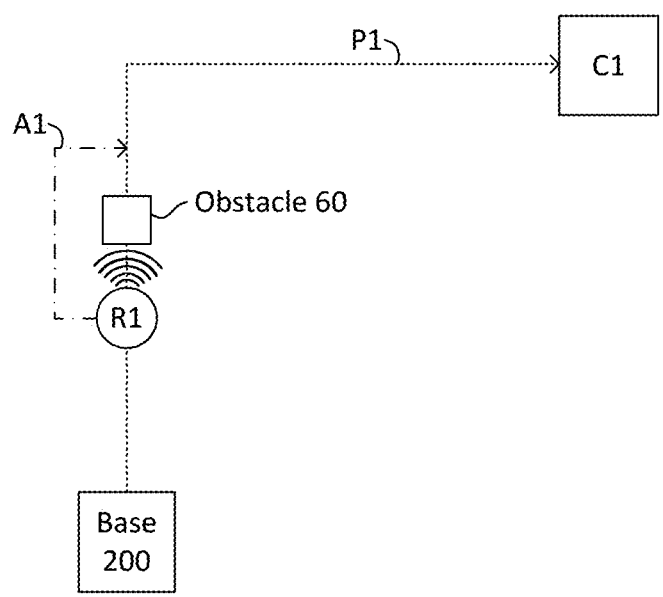
FIG. 8 illustrates an example of an embodiment of an automated robot determining an alternate path to avoid an obstacle.

FIG. 8 illustrates an example of an embodiment of an automated robot R1 determining an alternate path A1 to avoid an obstacle 60. As shown, an automated robot R1 may follow a path P1 from a base station 200 to a container C1. An obstacle 60 is positioned in the path P1. As the automated robot R1 approaches the obstacle 60, the automated robot R1 recognizes the obstacle 60 using one or more proximity sensors. The automated robot R1 may then develop an alternate path A1 to avoid the obstacle. In some embodiments, the automated robot R1 communicates information about the position of the obstacle to the base station 200 and the base station 200 develops and communicates the alternate path A1 to the automated robot R1. Thus, the automated robot R1 may avoid obstacles 60 in its path P1.

Figure 9:
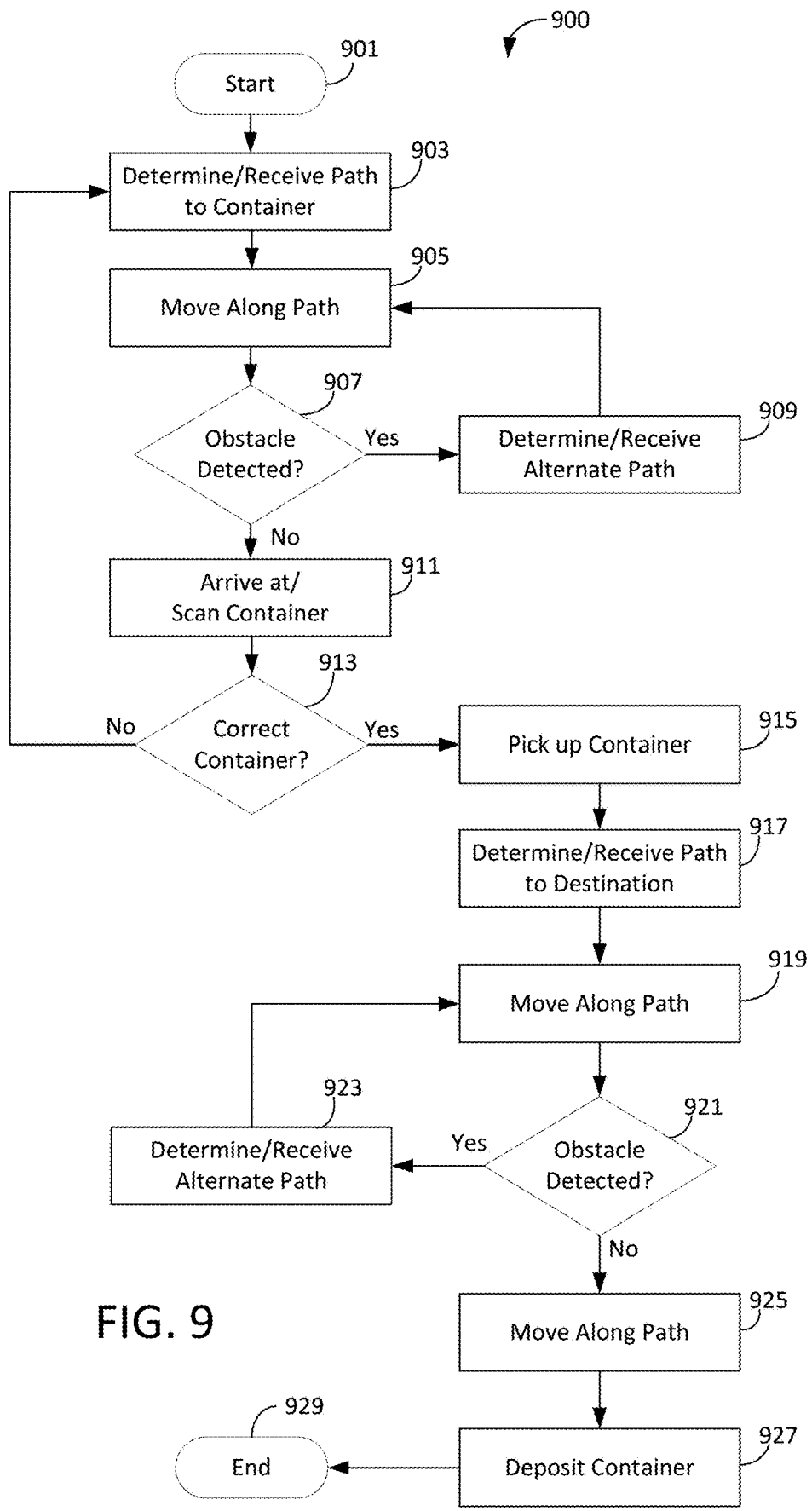
FIG. 9 is a flow chart illustrating an example method for moving a container with an automated robot.

FIG. 9 is a flow chart illustrating an example method 900 for moving a container with an automated robot 100 (or R1, R2). The method 900 begins at a start block 901. In some embodiments, at the start step 901 the automated robot 100 is docked with a base station 200. The method then moves to block 903, at which the automated robot 100 determines or receives a path to a container 400. The automated robot 100 may determine the path itself or may receive the path from another device, such as the base station 200. At block 905 the automated robot 100 moves along the path. In some embodiments, as the automated robot 100 moves along the path it scans its surroundings using proximity sensors. The proximity sensors can provide information about obstacles in the path.

As the automated robot 100 moves along the path the method 900 moves to decision state 907, at which it evaluates whether an obstacle is detected in its path. If an obstacle is detected, the method 900 moves to block 909 at which the automated robot 100 determines or receives an alternate path in an effort to avoid the obstacle. The automated robot 100 may determine the alternate path itself or may receive the path from another device, such as the base station 200. If no obstacle is detected at decision stat 907, the automated robot 100 follows the path until it arrives at the container 400. At block 911, the automated robot 100 scans a label or sensor of the container 400. At block 913, the automated robot 100 determines whether the scan indicates that the automated robot 100 has arrived at the correct container 400. If the scan indicates an incorrect container 400, the method 900 returns to block 903. If the scan indicates that the container is correct, the method moves to block 915, at which the automated robot 100 picks up the container 400. At block 917, the automated robot 100 determines or receives a path to its destination. The automated robot 100 may determine the path itself or may receive the path from another device, such as the base station. At block 919 the automated robot 100 moves along the path. Again, as the automated robot 100 moves along the path it scans its surroundings using proximity sensors. As the automated robot 100 moves along the path, it executes decision state 921, at which it evaluates whether an obstacle is detected in its path. If an obstacle is detected, the method 900 moves to block 923 at which the automated robot determines or receives an alternate path in an effort to avoid the obstacle. The automated robot 100 may determine the alternate path itself or may receive the path from another device, such as the base station 200. If no obstacle is detected at decision state 921, the method moves to block 925 at which the automated robot 100 continues to move along its path until it arrives at the destination. At block 927, the automated robot 100 deposits the container 400 at the destination. The method 900 ends at block 929.

The method 900 can be used to unload containers 400 (or C1, C2) from a transport vehicle (such as the truck 20). For example, the automated robot 100 can move to a container 400 on a transport vehicle, pick it up, and move it off the truck. The method 900 can be used to load containers 400 onto a transport vehicle. For example, the automated robot 100 can move to a container 400 off the transport vehicle, pick it up, and move it onto the transport vehicle. The method 900 can be used to move containers 400 between zones (e.g., zones 15A, 15B, 15C) or areas in a facility 15. For example, the automated robot 100 can move to a container 400 in one zone, pick it up, and move it to another zone. The method 900 can be repeated to load, unload, or move a plurality of containers 400. The method 900 can be executed on a plurality of automated robots 100 to load, unload, or move a plurality of containers 400 at substantially the same time.

In some embodiments, the method 900 is triggered when a transport vehicle (such as the truck 20) holding containers 400 arrives at a facility. For example, a driver can press a button on a vehicle-based system 300 to initiate the method 900 on one or more automated robots 100.

In some embodiments, when using automated robots 100 to load containers 400 onto transport vehicles, the containers 400 that will be delivered sooner (e.g., those containers with closest destinations) are loaded toward the back of the transport vehicle and the containers 400 that will be delivered later (e.g., those with farther destinations) are loaded toward the front of the transport vehicle.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The logical blocks, modules and flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a multicore processor, a system on a chip, a Pentium® Pro processor, a 8051 processor, a MIPS® processor, a Power PC® processor, Alphax® processor, a microcontroller, an Intel CORE i7®, i5®, or i3® processor, an AMD Phenom®, A-series®, or FX® processor, or any other microprocessor or microprocessor array. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, .NET (e.g., C#), Java, HTML, or other programming language and run under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A system for processing containers of items, the system comprising:
   one or more automated robots, the automated robots comprising:
      a housing sized to allow the one or more automated robots to be positioned underneath a container of items;
      a drive portion connected to a bottom portion of the housing;
      a lift mechanism connected to a top portion of the housing and configured to contact an underside of the container of items;
      one or more sensors, the sensors configured to identify a location of the one or more automated robots within a facility; and
      a scanner configured to read a container identifier on a container;
   a base station located in the facility and associated with the one or more automated robots, the base station comprising:
      one or more charging stations for charging the one or more automated robots;
      one or more processors configured to communicate with and instruct the one or more automated robots; and
   wherein the one or more processors are configured to:
      before arrival of a vehicle at a dock of the facility, receive, from a vehicle-based system on the vehicle, a vehicle identifier of the vehicle and the container identifier for the container, the container being located on the vehicle and intended for unloading at the facility;

determine an intended location for the container;

instruct one or more of the automated robots to move to a location of the container on the vehicle;

instruct the one or more of the automated robots to scan, via the scanner, a code located on the container;

receive the scanned code located on the container;

compare the receive scanned code with the container identifier received before arrival of the vehicle at the dock; and when the scanned code matches the container identifier, instruct the one or more of the automated robots to transport the container to the determined intended location for the container.

2. The system of claim 1, wherein the lift mechanism is configured to contact the underside of the container of items when the one or more automated robots are positioned underneath the container of items.

3. The system of claim 2, wherein the one or more automated robots are configured to move underneath the container and to actuate the lift mechanism to lift the container off a surface, thereby allowing the one or more automated robots to move the container.

4. The system of claim 1, wherein the container identifier includes a container type.

5. The system of claim 4, wherein the one or more processors further configured to determine, based on the container type, a number of the one or more automated robots required to transport the container.

6. The system of claim 5, wherein the container is a pallet, and wherein the server identifies that a plurality of automated robots are required to transport the pallet.

7. The system of claim 6, wherein the server instructs the plurality of automated robots to move to different locations under the pallet in order to transport the pallet.

8. The system of claim 1, wherein the one or more processors are configured to determine, in the distribution information database, the intended location for the container based on identifying, in the distribution information database, a next process for one or more items contained within the container.

9. The system of claim 8, wherein the distribution information database includes a plurality of locations within the facility, each of the plurality of locations being associated with a process within the facility, and wherein the server is configured to identify the intended location from the plurality of locations based on the next process for one of the one or more items in the container.

10. A method for processing containers of items, the method comprising:

before arrival at a dock of a facility of a vehicle, receiving, in a server of the facility, from a vehicle-based system of the vehicle, a container identifier for a container, the container being located on the vehicle and intended to be unloaded at the facility and a vehicle identifier of the vehicle;

determining, in a distribution information database, an intended location within the facility for the container;

instructing, by the server, one or more automated robots to move to a location underneath the container on the vehicle, the one or more automated robots comprising:
a housing sized to allow the one or more automated robots to be positioned underneath a container of items;
a drive portion connected to a bottom portion of the housing;
a lift mechanism connected to a top portion of the housing and configured to contact an underside of the container of items; and
one or more sensors, configured to identify a location of the one or more automated robots within the facility;
a scanner to read a code located on a container;

scanning, via the scanner on the one or more automated robots, the container;

comparing the read code on the container with the received container identifier; and when the read code corresponds to the received container identifier, instructing, by the server, the one or more automated robots to transport the container to the determined intended location for the container.

11. The method of claim 10, further comprising:

moving the one or more automated robots underneath the container;

actuating the lift mechanism on the one or more automated robots underneath the container;

contacting the lift mechanism with an underside of the container of items;

lifting the container off a surface, thereby allowing the one or more automated robots to transport the container; and moving the container to the intended location.

12. The method of claim 10, wherein receiving the container identifier comprises receiving a container type.

13. The method of claim 12, further comprising determining, based on the received container type, a number of the one or more automated robots required to transport the container.

14. The method of claim 13, wherein the container is a pallet, and wherein the method comprises determining that a plurality of automated robots are required to transport the pallet.

15. The method of claim 14, further comprising instructing the plurality of automated robots to move to different locations under the pallet in order to transport the pallet.

16. The method of claim 10, wherein the intended location for the container is determined by the server based on identifying, in the distribution information database, a next process for one or more items contained within the container.

17. The method of claim 16, wherein the distribution information database includes a plurality of locations within the facility, each of the plurality of locations being associated with a process within the facility, and wherein identifying the intended location for the container comprises identifying the intended location from the plurality of locations based on the next process for one of the one or more items in the container.

* * * * *